United States Patent

[11] 3,619,310

[72] Inventor Kenneth Clarke
       Knebworth, England
[21] Appl. No. 874,465
[22] Filed Nov. 6, 1969
[45] Patented Nov. 9, 1971
[73] Assignee Imperial Chemical Industries Limited
       London, England
[32] Priority Nov. 23, 1967
[33] Great Britain
[31] 53,398/67
       Continuation-in-part of application Ser. No.
       775,019, Nov. 12, 1971, now abandoned.

[54] METHOD OF MAKING LIQUID-FILLED
     PRESSURE-DISTRIBUTING PADS USED IN
     PRESSES
     6 Claims, 14 Drawing Figs.
[52] U.S. Cl. .................................................. 156/145,
         18/17 H, 29/422, 29/480, 100/295, 156/79,
         156/156, 156/196
[51] Int. Cl. ..................................................... B32b 1/10,
         B32b 31/20

[50] Field of Search............................................. 18/17 H;
         156/77, 79, 81, 145, 156, 163, 196, 197, 288

[56] References Cited
     UNITED STATES PATENTS
     2,018,736 10/1935 Norris ........................... 144/281.1
     2,564,656  8/1951 Chedister ..................... 156/145
     3,235,954  2/1966 Fromson ....................... 156/145 X
     3,454,985  7/1969 Latimer......................... 18/17 H
     3,530,029  9/1970 Lemelson...................... 156/79 X Primary Examiner—Carl D. Quarforth
Assistant Examiner—Roger S. Gaither
Attorney—Cushman, Darby & Cushman ABSTRACT: Rectangular flat surfaced cushion plates, for use as pressure distributing pads in pressing operations, are made by seam welding two flexible metal sheets together around three sides of the desired rectangle, introducing a cushioning liquid to form a layer between the two sheets, then closing the fourth side of the rectangle by seam welding and then subjecting the resultant convex surface sachet structure to pressure between the platens of the press to permanently deform the metal sheets in the vicinity of the welds.

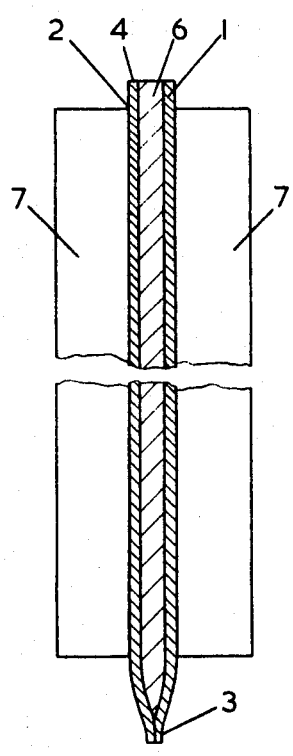
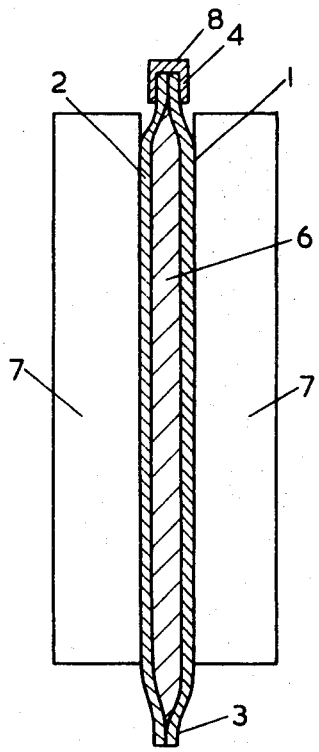
FIG. 3    FIG. 4
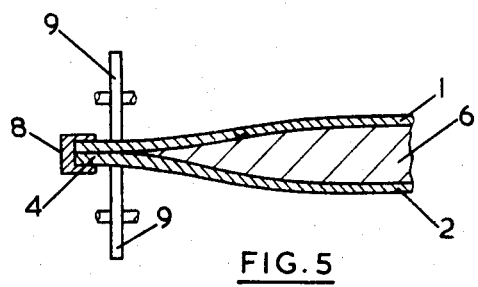
FIG. 5

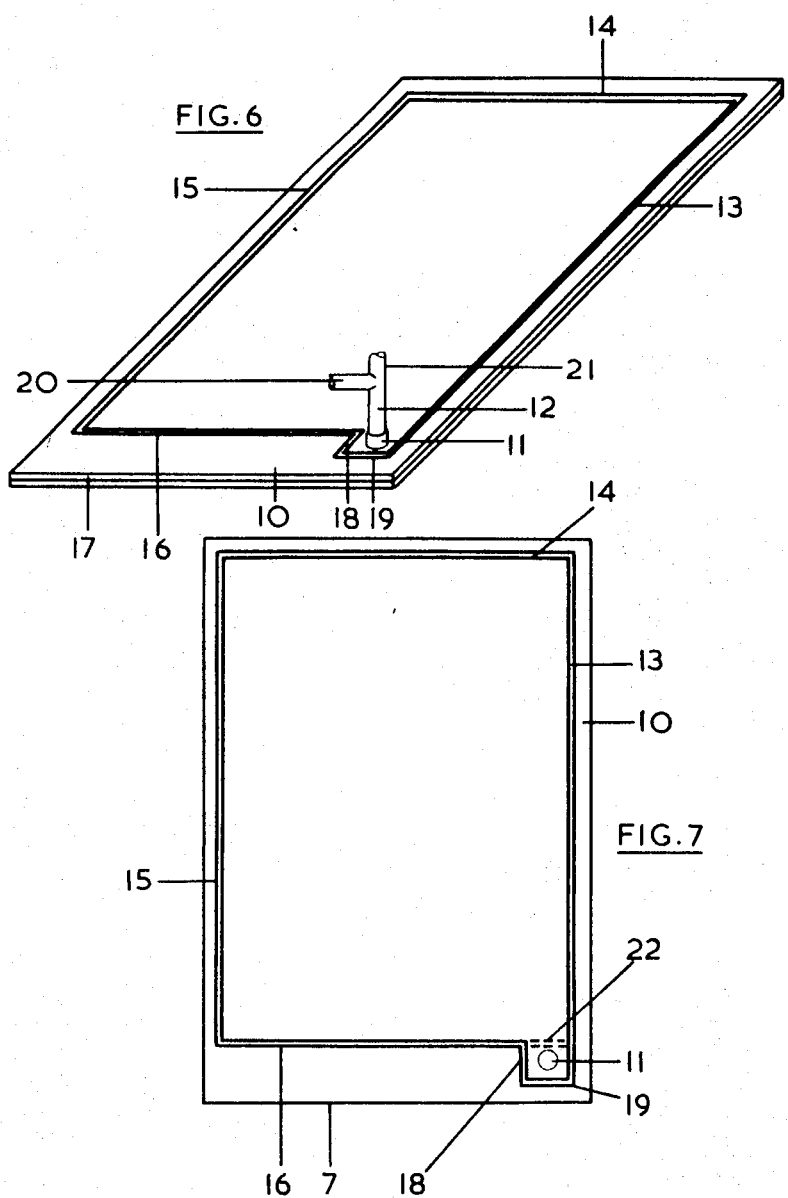

METHOD OF MAKING LIQUID-FILLED PRESSURE-DISTRIBUTING PADS USED IN PRESSES

This application is a continuation-in-part of application Ser. No. 775019 filed 12th Nov. 1968, now abandoned.

This invention relates to improvements in or relating to pressing sheet articles and in particular to an improved method of distributing pressure from a ram over the area of a sheet workpiece.

In the manufacture of sheet articles from materials such as plastics a convenient method is to subject the material to heat and pressure in a press, usually of the hydraulic type. The material is placed between plates having a polished or other suitable surface finish, hereinafter termed "press plates," and the plates are subjected to pressure between heated platens of the press. In addition, a relatively thick sheet of metal such as aluminum is often interposed between the platen and the press plates. The reasons for the use of such thick metal sheets are discussed hereinafter. This method suffers from the disadvantage, however, that where the area of the sheet being formed is large and so requires a platen area substantially greater than the area of the ram or rams exerting the pressure, the pressure transmitted by the ram or rams is not uniformly distributed over the surface of the platens with the result that the platens tend to "bow" and hence the pressure is not evenly transmitted to the material being pressed.

In addition, variations in thickness, i.e. poor thickness tolerances of the press plates and the sheet of metal, e.g. aluminum sheet, if used, cause uneven distribution of the pressure to the workpiece.

It has been common practice, especially when making pressed sheets from plastic materials, to attempt to alleviate these disadvantages by the incorporation of one or more layers of resilient material between the press platens and the press plates, or where a thick sheet of metal such as aluminum is also used, between that metal sheet, and the press plates.

Various systems have been proposed to provide this resilient layer including that proposed in British Patent 313,307 wherein there are used "cushions" made by fastening a membrane or diaphragm over a solid metal frame enclosing a cavity filled with a liquid. However, that method suffers from the disadvantage that the frame is not resilient and so the only useful area of the membrane is that within the framework. This means that localized stressing of the membrane in the vicinity of its joint to the supporting framework is liable to occur with consequent risk of failure.

The system most generally used at present is a wad of several sheets of paper. The use of such a wad suffers from several disadvantages including a very limited useful life necessitating very frequent renewal of paper in the wad; handling difficulties, especially when automated loading of the press is desired; and, where it is necessary to heat and/or cool the workpiece during the pressing operation, poor thermal conductivity from the press platen to press plates giving an uneven distribution of temperature over the workpiece and necessitating long press cycles.

The relatively thick sheets of metal, for example, aluminum mentioned hereinbefore are used for two purposes. Firstly, they are used to prevent the wad of paper sticking to the press platens. Some grades of paper do not stick, however, and in such case the upper metal sheet can be omitted. The lower sheet of metal is used essentially to facilitate handling of the "-cell" of wads of paper, press plates of mould and workpiece.

It would, therefore, be desirable to devise a system wherein the wad of paper and, where used, the relatively thick metal sheet, can be eliminated.

It was proposed in U.S. Pat. No. 2,018,736 to use as a pressure equalizing pad in a press a cushion consisting of a thin flexible panellike sealed casing filled with a material that is liquid at the temperature to which it is raised in the press. That specification indicated that such a cushion could be made by laying two sheets of steel of the proper size and shape one upon the other and welding the sheets together at their edges, an opening being left to permit the contents to be inserted and this opening being afterwards sealed.

I have found that cushions made in this way with the edges of the metal sheets welded together, i.e. by butt joints have a very short service life; the welded joint bursting or otherwise failing, thereby permitting escape of the liquid pressure distributing medium, after only one or two pressing cycles.

It has also been proposed in U.S. Pat. No. 3,454,985 to prepare pressure distributing pads filled with a fusible metal by seam welding together two thin metal shells leaving a small portion unwelded through which the cavity between the shells is filled. Thus unwelded portion is then seam welded to seal the shells together.

Such a system, using preformed shells requires the use of specially tooled presses to make the shaped shells and also presents difficulties in handling during the welding operation and difficulties filling.

I have devised a simpler method of making such pressure distributing pads, which I term herein "cushion plates."

Accordingly I provide a method of manufacturing a rectangular cushion plate for use as a pressure distributing pad in a sheet pressing operation comprising a pair of flexible metal sheets seam welded to each other to define a rectangular enclosure filled with a cushioning material that is liquid under the conditions of said pressing operation, said metal sheets being permanently deformed in the vicinity of the seam weld defining said rectangular enclosure so that the opposed surfaces of the metal sheets over substantially all said rectangular enclosure are planar and spaced apart from one another in a substantially parallel manner which comprises placing two flat flexible metal sheets face to face, seam welding said metal sheets to each other round three sides of the desired rectangular enclosure, introducing the cushioning material in liquid form between said metal sheets from the direction of the fourth side of the rectangular enclosure whereby said cushioning material forms a layer between said metal sheets, closing the fourth side of the rectangular enclosure by seam welding, whereby a convex surfaced sachetlike structure is formed, and permanently deforming the metal sheets in the vicinity of the seam welds defining the rectangular enclosure by subjecting said sachetlike structure to pressure between the platens of a press, whereby the opposed surfaces of the metal sheets over substantially all said rectangular enclosure are rendered planar and spaced apart in a substantially parallel manner.

I also provide a rectangular cushion plate for use as a pressure distributing pad in a sheet pressing operation comprising a pair of flexible metal sheets seam welded to each other to define a rectangular enclosure filled with a cushioning material that is liquid under the conditions of said pressing operation, said metal sheets being permanently deformed, after filling said enclosure with the cushioning material, in the vicinity of the seam welds defining said rectangular enclosure so that the opposed surfaces of the metal sheets over substantially all said rectangular enclosure are planar and spaced apart from one another in a substantially parallel manner.

The invention is illustrated by reference to the accompanying drawings wherein

FIGS. 1 to 5 illustrate one method of making the sachet-type structure,

FIG. 1 being a perspective view of two sheets joined along three sides,

FIG. 2 being a perspective view of the joined sheets with the fourth side wedged open for filling the cavity FIG. 3 being a vertical cross section of the plate during filling, FIG. 4 being a vertical cross section of the plate after clamping, and FIG. 5 being a vertical cross section of the plate during welding of the fourth side;

FIGS. 6 to 8 illustrate another method of making the sachet-type structure,

FIG. 6 being a perspective view of the plate before filling,

FIG. 7 being a plan view of the plate before filling with the filling pipe removed, and FIG. 8 being a view similar to FIG. 7 but illustrating an alternative mode of construction;

The the method illustrated by reference to FIGS. 1 to 5 the sachetlike structure, is made by seam welding the metal sheets round three sides of the rectangular enclosure, the metal sheets are then held apart along the fourth side to open up a cavity between the sheets into which the cushioning material is then introduced. The fourth side is then clamped so that the cavity is totally filled with the cushioning material and a fourth seam weld made to complete the sealing of the rectangular enclosure.

Figure 1:
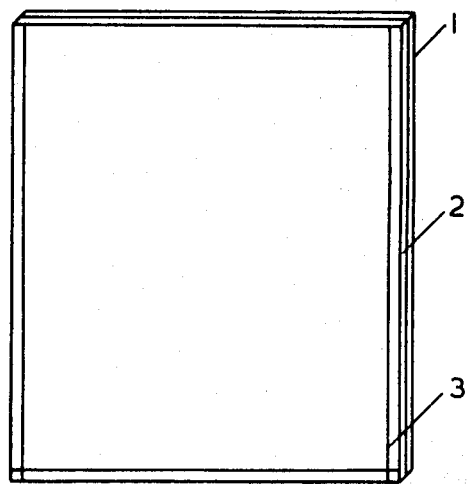
Figure 2:
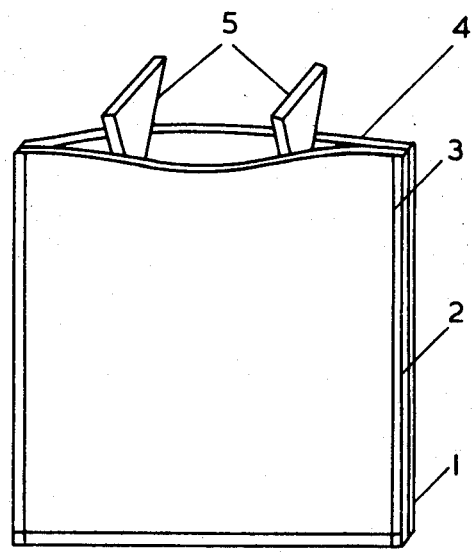

Thus referring to FIG. 1 two rectangular metal sheets 1,2, for example mild steel sheets of size 2 meters by 1 meter by 0.08 cm. thick, are placed face to face and seam welded round three sides. The line of weld is indicated at 3. The fourth side 4 is left unwelded and then the sheets 1,2 are forced apart along this side by, for example, wedges 5 (FIG. 2). The plate is mounted vertically with side 4 uppermost and the cavity between sheets 1,2 is filled with the liquid 6 (FIG. 3). In order to fill the cavity between the two sheets 1,2 completely, the plates are preferably pressed together slightly in a press 7.

Side 4 is then clamped, for example, by means of a sprung channel section member 8 (FIG. 4). The plate can then be turned to a horizontal position and seam welded along side 4, for example, by seam welding rollers 9 (FIG. 5). Clamp 8 can then be removed.

Another method of making the sachetlike structure is illustrated by reference to FIGS. 6 to 8.

In this method the two metal sheets are seam welded together to define an enclosed area, larger than the desired rectangular enclosure with the welds defining three sides of the desired rectangular enclosure. An inlet port is connected to the surface of one of the metal sheets within the enclosed area but outside the desired rectangular enclosure. The cushioning material is then pumped in through the inlet port to form a layer between the metal sheets and then a further seam weld is made to close the fourth side of the desired rectangular enclosure, thus isolating the filled rectangular enclosure from the rest of the enclosed area to which the inlet port is connected.

The portion of the enclosed area to which the inlet port is connected can then be trimmed off to give the sachetlike structure.

One way of operating this second method is illustrated in FIGS. 6 and 7.

Referring to these two FIGS., the sachetlike structure is made from two sheets 9,10 of mild steel each of size 180 cm. × 120 cm. × 0.8 mm. One sheet 10 has a hole drilled near one cone to which is brazed a threaded union 11 into which a pipe 12 can be screwed. The sheets are then seam welded together along three sides, the lines of the welds being indicated by numerals 13, 14 and 15. These welds define three sides of the desired rectangular enclosure. Along the fourth side of the desired rectangular enclosure a seam weld 16 is then made joining the sheets 9, 10 together for most of the length of the side, at a distance some way indented from the edge 17 of the sheet 10.

A closed area is then formed by additional seam welds 18, 19 connecting weld 16 with weld 13. This closed area encompasses the union 11. Pipe 12 is then connected to union 11. Pipe 12 carries a branch 20 which is connected to a metering pump via a valve neither of which are shown in the drawings, while the other end 21 of pipe 12 is connected via a valve (not shown) to a vacuum pump (not shown). A vacuum is applied by means of pipe 21 to ensure removal of any air trapped between the metal sheets and then the valve in the vacuum line is closed. The required amount of cushioning material is then pumped in by the metering pump connected to pipe 20.

After filling the cavity between the two sheets 9, 10 with the cushioning material, the weld 16 is continued to connect with weld 13 along dotted line 22. The union 11 and the excess of the sheets between weld 16 and the edge 17 is then trimmed off.

An alternative, preferred, way of operating this second method, is to seam weld the metal sheets to give a trapezium (which may be a rectangle) in which three of the sides are perpendicular to each other and define three sides of the desired rectangular enclosure. An inlet port is connected to the surface of one of the metal sheets within this trapezium but outside the desired rectangular enclosure and the cushioning material introduced through this inlet port. After filling the enclosure defined by the seam welds, a transverse seam weld is made to define the rectangular enclosure.

Figure 8:
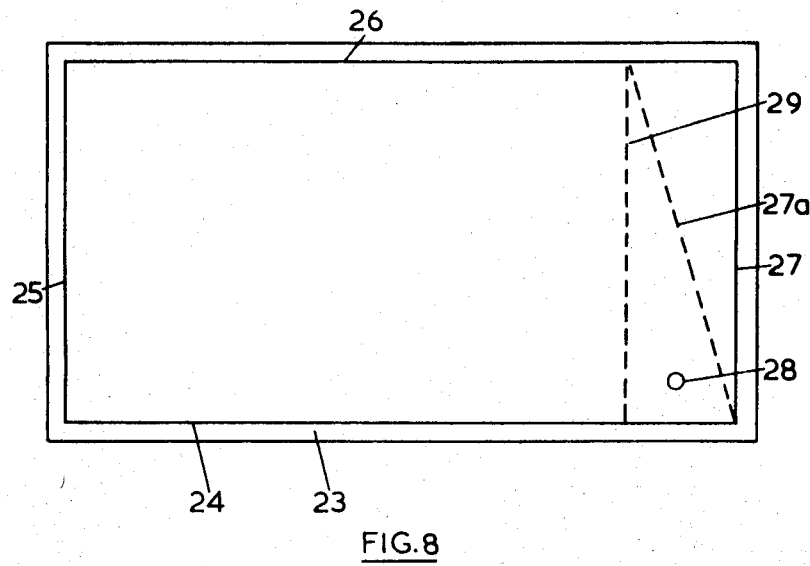

This mode of operation is depicted in FIG. 8. The two metal plates, one of which is indicated by numeral 23, are seam welded together by welds 24, 25, 26 and 27 to define a rectangle. Weld 27 need not be perpendicular to welds 24 and 26. Thus it may be inclined as indicated by dotted line 27a to define an irregular trapezium instead of a rectangle.

Welds 24, 25 and 26 define three sides of the desired rectangular enclosure. An inlet portion 28 is connected to the surface of sheet 23. The cushioning material is introduced to the space between the metal plates enclosed by welds 24, 25, 26 and 27 by the method described above in relation to FIGS. 6 and 7. After filling, a seam weld is made along dotted line 29 to define the desired rectangular enclosure and to isolate the addition portion to which inlet port 28 is connected. As described above in relation to FIGS. 6 and 7, this additional portion can then be trimmed off.

After this welding and filling operation the cushion plate has a generally curved form approximately to a convex lens herein referred to as the sachetlike structure. For use in pressing sheet articles, for example plywood, plastic laminates and block board it is necessary that the cushion plate has substantially flat planar surfaces spaced apart in a substantially parallel manner.

Thus in the method of manufacturing cushion plates in accordance with the invention the sachetlike structure is subjected to pressure in a press to permanently deform the metal sheets in the vicinity of the seam welds defining the rectangular enclosure so that the opposed surfaces of the metal sheets over substantially all said rectangular enclosure are planar and spaced apart in a substantially parallel manner. It will be appreciated that after the permanent deformation, the metal sheets are not planar and parallel spaced over the entire area of the rectangular enclosure since a small boundary region within the rectangular enclosure accommodates the transition of the metal sheets from the plane of the seam weld to the plane of the parallel spaced portion of the sheets.

The size of this boundary area will, of course, depend on the physical dimensions of the cushion plates, including the thickness of the layer of cushioning material and on the pressure to which the sachetlike structure is subjected in the deformation step. The higher the pressure used in the deforming step, of course, the smaller this boundary area will be, with consequent greater useful area of the cushion plate. However, too high a pressure may distort the metal too much giving rise to possible weakness.

The pressure used to deform the sachetlike structure should be greater or equal to the pressure to which the cushion plate will be exerted in subsequent use, and in any case should exceed 7 kg./cm.$^2$ in order to provide permanent deformation of the sachetlike structure.

It is often desirable to test the cushion plate before use for safety reasons and consequently it is often desirable to check that it will withstand double the normal working pressure. Such testing can usefully be combined with the pressing step deforming the sachetlike structure by performing the deformation step at the test pressure. Since sheet pressing processes generally use pressures of less than 100 kg./cm.$^2$, there is generally little point in using deformation pressures in excess of 250 kg./cm.², although deformation pressures as 500 kg./cm.² can be used if desired.

Particularly useful deformation pressures lie within the range 15 to 220 kg./cm.².

It desired the deformation of the sachetlike structure may be performed under actual working conditions by using the sachetlike structure as a cell component in an actual sheet pressing process. In this case the deformation occurs during the first pressing cycle. Where very low deformation pressures are used, e.g. of the order of 7 kg./cm.², several pressing cycles may be necessary to produce a pronounced permanent deformation.

Since the area of the flat surfaces of the cushion plates is slightly less than the area of the rectangular enclosure, the area over which pressure will be uniformly distributed to a workpiece in a pressing process utilizing the cushion plate as a pressure distributing medium will also be slightly less than the rectangular enclosure.

Consequently when using a workpiece larger than the flat surfaces of the cushion plate, the whole of the workpiece will not be subjected to uniform pressure; thus the portions of the workpiece extending beyond the flat surfaces will be subjected to a lesser pressure.

Often, particularly in the production of pressed plastics sheet materials, it is normal to trim the edges of the workpiece after pressing and so the workpiece used is normally slightly oversize.

In working the present invention, therefore, should the nonuniformity of pressure distribution at the portions of the workpiece overhanging the flat surfaces of the cushion plate give rise to defects in the overhanging portions of the pressed product, such defects can be overcome by edge trimming. The size of the cushion plate used should therefore be determined to allow for such edge trimming.

On the otherhand if the workpiece is substantially smaller than the flat surfaces of the cushion plate, on pressing permanent distortion or indentation of the flat surfaces of the cushion plates may occur.

Therefore, to avoid such risk of indentation the workpieces are preferably larger than the flat surfaces of the cushion plate and any defective edge portions are removed by edge trimming.

Also to be borne in mind when determining the required size of cushion plate is that the corners of the flat surfaces will normally be rounded slightly and so the effective rectangular area over which uniform pressure distribution is obtainable is slightly less than the actual dimensions of the flat surfaces.

It is generally to be preferred that where press plates are used between the workpieces and the cushion plates, such press plates are larger than the flat surfaces of the cushion plate. Even where such "overhanging" press plates are used the use of substantially undersize workpieces may give rise to distortion and indentation of the flat surfaces of the cushion plate and press plates.

During the manufacture of the plates, if desired, suitable projections may be incorporated at the edges of the plates by welding or other means to facilitate handling of the plate or to act as guides for positioning the plate in the press.

The sheet material from which the cushion plates are made may be any suitable metal, comprising, for example, copper, mild steel or stainless steel, but mild steel is preferred for convenience of fabrication and also from an economic viewpoint.

The thickness of the metal sheets used to make the cushion plates will depend to some extent on the nature of the metal used and on the overall area of the plate. Generally, however, for mild steel, copper and similar metals, a thickness of 0.035 cm. to 0.2 cm. is satisfactory for plates having linear dimensions of up to 3 meters by 2 meters or even larger.

While thinner sheets could be used, they are not sufficiently robust to withstand prolonged handling and so would have relatively short service lives. Likewise thicker sheets could be used but have the disadvantage of being unnecessarily heavy and hence wasteful of metal. The preferred thickness range is from 0.05 to 0.16 cm.

The cushion plates themselves may be relatively thin, for example about 2 to 10 mm. thick.

During pressing processes, the workpiece is subjected to pressure, normally with the application with heat. In some cases the workpiece is also cooled under pressure.

The cushioning material used to fill the rectangular enclosure in the cushion plate has two main functions:

i. to transmit the applied pressure to the workpiece evenly, accommodating any thickness variations in other components of the "cell" being pressed, and ii. to conduct heat to the workpiece from the heating means during the heating cycle and, if a cooling step is employed, from the workpiece to the cooling means.

In order to perform the first function, the cushioning material has to be one that is liquid under the conditions of the pressing operation. It is not necessary, however, that it is liquid at room temperature and in some cases therefore the cushioning material may be material that is solid at room temperature but having a melting point below the pressing temperature.

This has the advantage that the plate has a greater rigidity at room temperature than one filled with a material that is liquid at room temperature. This improved rigidity facilitates handling of the plate.

In order to perform the second function, the cushioning material desirably has a high thermal conductivity and/or the thickness of the cushioning material is desirably kept to a minimum. If the overall conductivity characteristics of the cushion plate are good then press cycle times may in some cases be markedly reduced.

The possibility of the use of a cushioning material that is solid at room temperature permits the use of some metallic material as the cushioning material that is solid at room temperature permits the use of some metallic material as the cushioning material, thereby enabling advantage to be taken of the superior thermal conductivity of metals over nonmetallic cushioning materials, such as oils and waxes.

Where a cushioning material that is solid at room temperature is used, it is preferred, however, that its melting point is substantially lower than the maximum pressing temperature so that it is ensured that all the cushioning material is liquid at the maximum pressing temperature, and indeed for most of the time that the workpiece being pressed is subjected to an elevated temperature.

Pressing operations, particularly in the manufacture of laminated sheet articles such as laminated thermosetting and thermoplastic plastic materials, plywood, blockboard and pressed wood fiber articles such as hardboard, softboard and chipboard are generally performed using heating and optionally cooling cycles with a maximum temperature in the range 120° to 20° C., particularly 150° to 220° C., depending on the nature of the material being pressed.

The cushioning material therefore should have a melting point below 120° C. preferably below 100° C.

Solids that can be used as cushioning materials in appropriate cases include organic compounds such as waxes and some metals, particularly some alloys of bismuth, lead, tin and/or cadmium, as are well known in the art.

The use of a cushioning material that is solid at room temperature has some disadvantages, particularly in relation to the operation of filling the cushion plates as it is necessary to fill the cushion plate with the cushioning material in the liquid state to ensure complete filling. With the use of a cushioning material that is solid at room temperature this means that the filling operation is complicated by the necessity of the use of associated heating apparatus.

Likewise when performing the pressing step to permanently deform the metal sheets of the sachetlike structure, it is also necessary that the cushioning material is in the liquid state.

I, therefore, in general, prefer to use a cushioning material that is liquid at room temperature, i.e. at about 18° C.

While mercury might appear to be the ideal liquid because of its high thermal conductivity, disadvantages are associated with its use: notably its cost; its density which markedly adds to the weight, and hence difficulty of handling, of the cushion plates; and its tendency to amalgamate with certain metals which might otherwise be desirably used to form the cushion plates.

Suitable liquids include mineral oils, water, silicone oils, glycol and glycerol.

Glycerol, while having a reasonably good thermal conductivity, has the disadvantage that mild steel, and hence cushion plates made therefrom, catalyzes the decomposition and polymerization of glycerol.

This, however, can be minimized by incorporating a suitable stabilizer in the glycerol, for example, borax or 1,1,3-tris-(3-t-butyl-4-hydroxy-6-methyl phenyl)butane.

Indeed, with any liquid, suitable stabilizers may be incorporated as necessary, e.g. sodium nitrite may be added to water to inhibit rust formation when water is used to fill ferrous metal plates.

Glycol, i.e. ethylene glycol, has a slightly inferior thermal conductivity compared with glycerol, but is more stable than glycerol when used in cushion plates made from mild steel.

Mineral oils, generally have poor thermal conductivities and have the added disadvantage of interfering to some extend with welding operations and so can cause weaker welds to be formed in the cushion plates.

Water is generally satisfactory and, for a liquid, it has a good thermal conductivity. However, because of its relatively low boiling point its use is generally limited to pressing temperatures below about 250° C. or else unnecessarily high pressures are required to maintain the water in the liquid phase. For higher temperature work, glycol, glycerol or silicone oils may be used. However, because silicone oils have a poor thermal conductivity but are otherwise satisfactory they are preferably only used as the cushioning material in pressing operations where the press is heated all the time and no cooling cycle under pressure is employed, i.e. the cell is removed from the press before cooling, for example, as in plywood manufacture.

If desired solid materials or other liquids may be mixed with the cushioning material provided they remain uniformly dispersed in the cushioning material in order to improve its thermal conductivity properties.

The minimum average thickness of the layer of cushioning material in the cushion plates is determined by the maximum expected thickness variation of the components of the cell being pressed. However, if the average thickness of the liquid layer is made near to the maximum expected thickness variation of the cell components, a large variation in the actual thickness of the liquid in the cushion plate may be obtained. This can give rise to a marked variation in overall thermal conductivity of the cushion plate from area to area, thereby giving rise to uneven heating of the workpiece which, particularly in a lamination process, may give rise to defects in the final pressed article. The average thickness of the liquid layer is therefore preferably somewhat in excess of the expected maximum thickness variation of the cell components.

Generally each cushion plate is used in conjunction with a press plate; and normally it is the press plate that is the component of the cell that exhibits the thickness variation that is desirably compensated.

The average thickness of the layer of cushioning material in the cushion plate is preferably at least twice the maximum thickness variation of the associated press plate so as to avoid problems of uneven thermal conduction.

Where a press plate is utilized on either side of the cushion plate, for example, as in the manner described hereinafter, it is generally not necessary that the average thickness of the layer of cushioning material is increased over that required for a single press plate. Thus the average thickness of the layer is preferably at least twice the maximum thickness variation of the adjacent press plate that has the greatest thickness variation.

The average thickness of the layer of cushioning material is preferably 1 to 9 mm. and in particular 2 to 5 mm.

If the average thickness of the layer of cushioning material is too great, then the thermal conductivity characteristics of the cushion plate are liable to be poor.

In use, the cushion plates are made part of a "cell" that is to be pressed between a pair of press platens.

Therefore I also provide a method making pressed sheet articles wherein a cell containing the workpiece is subjected to pressure in a press, in which a cushion plate made in accordance with the present invention is used as a pressure distributing pad.

Numerous arrangements of the cell components can be devised, including those depicted in FIGS. 9 to 13. In these Figures the thicknesses of the various components are exaggerated for the sake of clarity.

Figure 9:
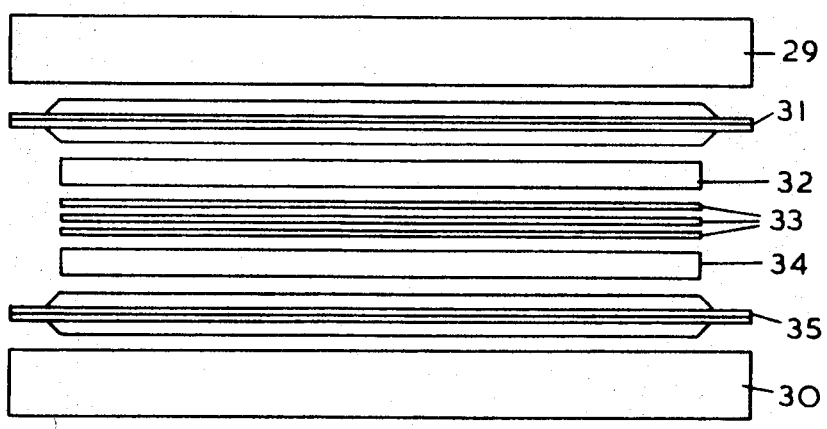
FIGS. 9 to 13 illustrate the method of use of the cushion plates and are elevations of alternative press assemblies with the components spaced apart for clarity.

In FIG. 9 the press platens are indicated at 29, 30 and interposed therebetween is a "cell" consisting of, in order:

| a cushion plate | 31 |
| a press plate | 32 |
| the workpiece | 33 |
| a press plate | 34 |
| and a cushion plate | 35 |

Figure 10:
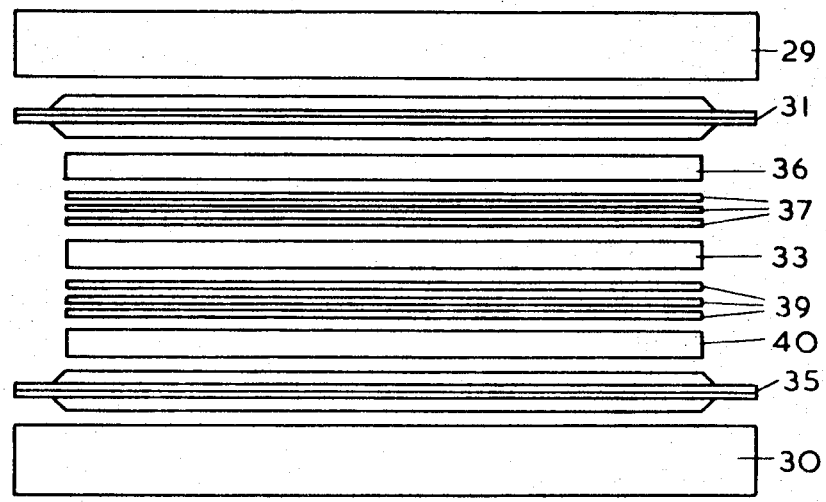

In FIGS. 9 to 13 each workpiece is shown as three sheets to be laminated together. It will be appreciated, however, that each workpiece can consist of more or less layers or even a single sheet. Where the workpiece is relatively thin, more than one workpiece can be pressed between a pair of platens. Such a system is depicted in FIG. 10, where the cushion plates and press platens are given the same reference numerals as in FIG. 9. Interposed between the cushion plates 31 and 35 is a sandwich consisting of, in order:

| a press plate | 36 |
| a first workpiece | 37 |
| a press plate | 38 |
| a second workpiece | 39 |
| and a press plate | 40 |

In FIG. 11 again two workpieces are being pressed but only one cushion plate is used. In this system the cell interposed between the platens 29 and 30 consists of, in order:

| a press plate | 41 |
| a first workpiece | 42 |
| a press plate | 43 |
| a cushion plate | 44 |
| a press plate | 45 |
| a second workpiece | 46 |
| and a press plate | 47 |

Figure 11:
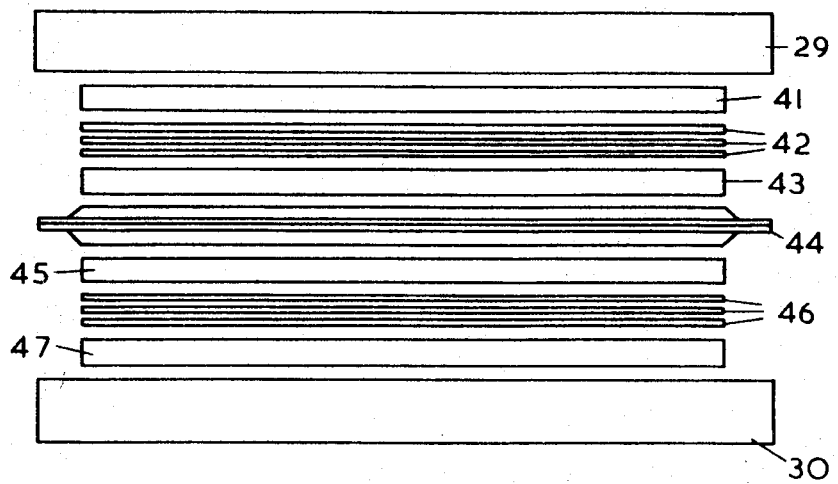

In each of the systems depicted in FIGS. 9 to 11, it is seen that the cell arrangement is symmetrical. This is generally to be preferred from consideration of the thermal characteristics to be preferred from consideration of the thermal characteristics to ensure that each workpiece is given equal heat treatment, assuming both platens are heated and/or cooled.

Figure 12:
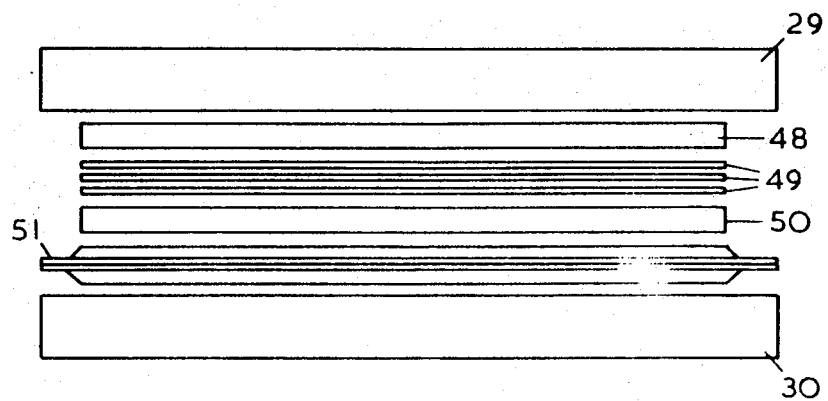

In FIG. 12 an alternative, nonsymmetrical system is depicted, using only one cushion plate. Here the "cell" interposed between the platens 29 and 30 consists of, in order:

| a press plate | 48 |
| a workpiece | 49 |
| a press plate | 50 |
| and a cushion plate | 51 |
| the latter being at the bottom of the cell. | |

While in this case the "cell" is not symmetrical, uniform heat transfer characteristics can be approximated by appropriately adjusting the relative temperatures of platens 29 and 30 and/or by use of a cushion plate with good thermal conductivity, for example, by the use of a cushion plate filled with mercury or a fusible metal.

Figure 13:
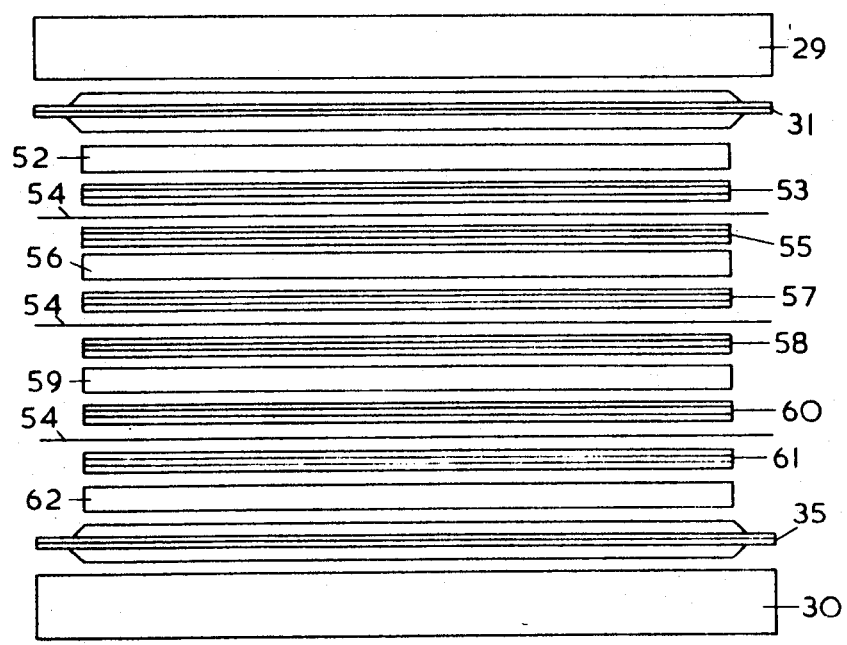

In FIG. 13 another form of cell assembly is illustrated and which is applicable to the formation of pressed articles such as laminates of absorbent material impregnated with a thermosetting resin wherein only one surface of the workpiece has to be given a high quality finish. Here the cell interposed between platens 29 and 30 consists of, in order, from the top downwards;

| a cushion plate | 31 |
| a press plate | 52 having a high quality finish on its under surface |
| a workpiece | 53 |
| a separating layer | 54 |
| a workpiece | 55 |
| a press plate | 56 having a high quality finish on both surfaces |
| a workpiece | 57 |
| a separating layer | 54 |
| a workpiece | 58 |
| a press plate | 59 similar to plate 56 |
| a workpiece | 60 |
| a separating layer | 54 |
| a workpiece | 61 |
| a press plate | 62 having a high quality finish on its upper surface |
| and a cushion plate | 35 |

Each of the six workpieces is arranged so that the layer adjacent to the press plate is that to which the high quality finish is to be given. The separating layers are used merely to prevent lamination together of the two workpieces placed between a pair of press plates.

It will be appreciated that other arrangements may be used, depending on the nature of the material being pressed, and the other components of the cell, and on the press itself.

It is seen that in each of the above systems, each workpiece is sandwiched between a pair of press plates, or where only one surface of the workpiece has to be given a high quality finish, each workpiece is pressed against a press plate. In order to impart the desired surface finish quality the press plates may be, for example, highly polished, engraved, embossed, or reliefed. In some cases the cushion plate can be given a suitable surface finish so that the press plate can be omitted between the cushion plate and the workpiece.

It is often desirable, although not essential, to arrange the cell so that a cushion plate occurs adjacent to at least one side of each workpiece, with or without a press plate interposed therebetween. However, this is not the case in the system depicted in FIG. 13.

It is often desirable, although not essential, to arrange the cell so that a cushion plate occurs adjacent to at least one side of each workpiece, with or without a press plate interposed therebetween. However, this is not the case in the system depicted in FIG. 13.

It is preferred to arrange the cell so that a cushion plate is the bottom component, for example, as in the systems depicted in FIGS. 9, 10, 12 and 13 as in this way the cushion plate can be used for carrying the cell for handling purposes, for example, for loading and unloading the cell from the platens.

If desired, the lower press platen may be provided with air vents so that it can act as an air flotation table to assist loading and unloading of the press as described in copending U.K. Patent application 61379/68.

In order to lighten the cell when using an arrangement of the type depicted in FIGS. 9, 10 and 13 the upper cushion plate 31 may be fastened to the upper platen.

In the commercial production of pressed sheet articles, particularly plastics sheets, what is termed a multidaylight press is often used. This is a press, normally vertically operating, having a fixed platen, normally the uppermost one, and a platen acted upon by the ram, usually hydraulically operated. This "-driven" platen is normally the bottom platen. Between the fixed and driven platens there are mounted several intermediate "free" platens slidably mounted on vertical guides provided with stops, or other means, to limit the movement of the platens, so that when the press is open a number of spaces, termed "daylights," occur between each platen into which a "cell" consisting of a sandwich of the workpiece, press plates, resilient layers, and other metal plates, if used, are inserted.

The fixed and driven platens generally have the same form as the the intermediate platens. A typical commercial press may be equipped with a total of, for example, 11 platens giving 10 "daylights."

The apparatus of the invention is particularly suited to the manufacture of pressed sheets, particularly laminates of plastics materials, for example by the lamination of foils of a thermoplastic polymeric material such as polyvinyl chloride or layers of absorbent material impregnated with a thermosetting resin. The apparatus is also of use in the manufacture of laminates such as plywood or blockboard where, although the thickness tolerance required is not so critical, the press capacity can be increased by the use of thinner cells, and by the use of faster pressing cycles.

By virtue of the use of the cushion plates, even pressure and temperature distribution can be applied to the workpiece. Also because of the improved thermal conductivity of the cushion plates compared with wads of paper the cycle time can be reduced and because thinner cells can be used, the press capacity may be appreciably increased.

In the pressing operations, used heretofore, the pressure utilized has often been relatively high, of the order of 35 to 100 kg./cm.$^2$ gauge or more in order to obtain a satisfactory pressed article. I have found that, using the cushion plates, equally satisfactory or even better pressings may be made using much lower pressures,, in fact often less than 14 kg./cm.$^2$ gauge. Indeed good pressings have been made utilizing pressures of less than 7 kg./cm.$^2$ gauge and in particular at pressures of from 2 to 3.5 kg./cm.$^2$ gauge. However, a satisfactory pressure for pressing thermoplastic materials or for pressing workpieces comprising vegetable fiber containing materials, such as wood lamination or pressing resin impregnated wood fiber compositions, is in the range from 14 to 20 kg./cm.$^2$ gauge. For pressing layers of absorbent materials, such as paper, impregnated with thermosetting resins to make decorative laminate materials, higher pressures are generally required, up to 50 kg./cm.$^2$ gauge, in order to obtain the desired surface finish. Even so this represents a marked reduction in the pressure required compared with conventional pressing techniques.

As the pressures required can be smaller than in a conventional pressing process, there is a considerable economic saving when installing suitable presses. Thus often low-pressure presses are required whereas the normal pressing process require high-pressure presses which are far more costly than low-pressure presses.

The reason for the necessity of the use of high-pressure presses in conventional pressing processes is thought to be that considerable pressures are required to deform the wad of paper or other resilient material to compensate for bowing of the platens and the thickness variations of the press plates and other members used.

Using the cushion plates, however, very little pressure is required to locally deform the cushion plates and so much lower operating pressures can be used. In addition, because low pressures can be used, there will be little tendency to bow the platens and so little compensation will be required. However, in conventional pressing processes as high pressures are required to locally deform the paper wad or other resilient material to compensate for local press plate thickness variations, these high pressures also increase the bowing tendency of the platens and so even higher pressures are required for compensation of bowing.

The invention is illustrated by the following examples.

EXAMPLE 1

A pair of cushion plates of size 180 cm. × 120 cm. were made from mild steel sheet of thickness 0.8 mm., the cavity in the plates being filled with water containing 0.1 percent by weight of sodium nitrite as rust inhibitor. The plates were made by the process illustrated in FIGS. 1 to 5 and described hereinbefore. The sachetlike structure was pressed at 210 kg./cm.² to convert them to the necessary flat surfaced form. The layer of water had an average thickness of 2.5 mm. The cushion plates were used as components of a cell assembly of the type shown in FIG. 10, using polished stainless steel plates having an average thickness of 1.5 mm. and a maximum thickness variation of 0.1 mm. as the press plates. Eight foils of polyvinyl chloride each having a thickness of 0.5 mm. were used as each workpiece. The foils were laminated at a temperature of 180° C. and a pressure of 17 kg./cm.² gauge to give laminated sheet of good surface finish and thickness tolerance.

The use of the water-filled cushion plates in place of the wad of brown paper required to give an equivalent surface finish and thickness tolerance enabled the cycle time to be reduced by 40 percent.

EXAMPLE 2

In this example two sheets of rigid polyvinyl chloride are press polished, that is to say that, by pressing, matt finished sheets are given a polished surface finish.

The cell arrangement depicted in FIG. 10 is utilized using a pair of cushion plates 31 35 of overall size 41 cm. × 41 cm. made from mild steel sheet of thickness 0.8 mm., the cavity in the plates being filled with glycerol containing borax as a decomposition and polymerization inhibitor. The average thickness of the glycerol layer was 1.6 mm. The plates were made by the same process used to make the plates used in example 1. The size of the rectangular enclosure was 39 cm. × 39 cm.

The top and bottom press plates 36, 40 were stainless steel sheets of thickness 3 mm. having one highly polished surface (that adjacent to the workpiece) and having a maximum thickness variation of 0.2 mm.

The middle press plate 38 was a stainless steel sheet of thickness 1.5 mm. having both surfaces highly polished and a maximum thickness variation of 0.25 mm. Each workpiece was a sheet of matt finish rigid polyvinyl chloride sheet of size 39 cm. × 39 cm. and having a thickness of 3 mm. The cell was subjected to a pressure of 17 kg./cm.² gauge at a temperature of 175° C.

The resultant pressed polyvinyl chloride sheets had a highly polished surface finish of good quality and had a good thickness tolerance and were equivalent to sheets press-polished using a wad of brown paper in place of the cushion plates and a pressure of 53 kg./cm.² gauge. Using the cushion plates the cycle time was reduced by 18 percent from that required using a brown paper wad as the cushion.

EXAMPLE 3

A cell assembly of the type illustrated in FIG. 13 was used in the production of decorative laminate sheets based on paper impregnated with a thermosetting resin.

The cushion plates 31, 35 has a size of 75 cm. × 75 cm., and were made by seam welding mild steel plates of thickness 0.8 mm. by the method used in example 1. The cavity in the plates was filled with a layer of silicone oil of average thickness 2 mm.

The press plates 52, 56, 59 and 62 were made of stainless steel of thickness 0.15 mm. and having a maximum thickness variation of 0.3 mm. Plates 52 and 62 were polished on one face only while sheets 56 and 59 were polished on both faces.

Each workpiece 53, 55, 57, 58, 60 and 61 consisted of, in order:
one sheet of alpha cellulose paper impregnated with a melamine/formaldehyde resin,
one sheet of a pigmented decorative paper impregnated with a melamine/formaldehyde resin, and
five sheets of paper impregnated with a phenol/formaldehyde resin.

The workpieces were arranged in the cell so that the sheet of impregnated alpha cellulose paper was adjacent to the press plate.

The separating layers 54 each consisted of one sheet of glassine paper.

The cell was pressed at a pressure of 44 kg./cm.² gauge at a temperature of 140° using a cycle time of 65 minutes. the resulting decorative laminates were of acceptable quality. Using a wad of brown paper in place of the cushion plates a pressure of about 100 kg./cm.² gauge was required to give a product of equivalent quality.

EXAMPLE 4

Plywood was made by laminating birch veneers using an aqueous phenol/formaldehyde resin adhesive using a cell arrangement of the type shown in FIG. 10.

The cushion plates were similar to those used in example 1 but were filled with a silicone oil. The average thickness of the silicone oil layer was 2.2 mm.

The veneers were pressed at 17 kg./cm.² gauge at 140° C., to give a plywood of good quality.

EXAMPLE 5

A pair of cushion plates having a rectangular enclosure of size 264.5 cm. × 124.5 cm. and flat surfaces of size 244.5 cm. × 122.5 cm. were made by the procedure illustrated with reference to FIG. 8 from mild steel sheets of thickness 0.8 mm. The rectangular enclosure was filled with ethylene glycol and this ethylene glycol layer, after the sachetlike structure had been deformed at a pressure of 210 kg./cm.² between the platens of a press, had a thickness of 1.3 mm.

The cushion plates were used in a cell of the type shown in FIG. 9. The press plates were stainless steel sheets of thickness 1.6 mm. having one polished surface adjacent to a workpiece consisting of three foils of polyvinyl chloride each of thickness 0.5 mm. The press plates and foils were larger than the area of the flat surfaces of the cushion plates. The foils were laminated together at a temperature of 170° C. under a pressure of 60 kg./cm.² gauge.

The resultant laminate was edge trimmed to a finished size of 244 cm. × 122 cm. and this finished sheet had a good thickness tolerance and was equivalent to laminates made conventionally at the same temperature and pressure but using a wad of brown paper of 5 mm. thickness and an aluminum plate of 10 mm. thickness in place of each cushion plate. Thus about 1.2 cm. of the space between each pair of platens was saved by using the cushion plates and so a cell arrangement of the type illustrated in fig. 10 could have been used in the same space thereby enabling two laminated sheets to be made in the space previously required for the production of one sheet.

EXAMPLE 6

Example 5 was repeated but using a laminating pressure of 3 kg./cm.². The laminated sheet had a good surface finish and a superior thickness tolerance to that of sheets made at a pressure of 60 kg./cm.².

EXAMPLE 7

By way of comparison several cushion plates of different sizes were made by an edge welding method. In this method two sheets of the metal were formed into shallow traylike structures and placed edge to edge to enclose a cavity. The abutted edges were butt welded together. During the butt welding process inlet and outlet pipes were inserted at diametrically opposed locations on the perimeter of the weld. After welding the cavity was filled with a mineral oil cushioning material via the inlet pipe by suction applied to the outlet pipe. When full those inlet and outlet pipes were sealed off by welding.

Cushion plates made in this way from copper, copper alloys and mild steel all began to leak at the weld line during the first pressing when used to press laminate foils of polyvinyl chloride at 170° C. using a pressure of about 70 kg./cm.².

On the other hand cushion plates made in accordance with the invention from mild steel have been subjected to a vigorous fatigue testing procedure which indicated a service life of thousands of pressing cycles.

In this fatigue testing, the cushion plates used had a rectangular enclosure of dimensions 14 cm. × 18 cm. and were made from mild steel (EN2A) of thickness 0.7 mm. The plates were made by the procedure illustrated in FIGS. 1 to 5 and described hereinbefore and had the rectangular enclosure filled with a layer of stabilized ethylene glycol of thickness 1.3 mm. The sachetlike structure was not subjected to the deformation step prior to testing as the testing procedure would give the appropriate deformation during the first pressing cycle.

Figure 14:
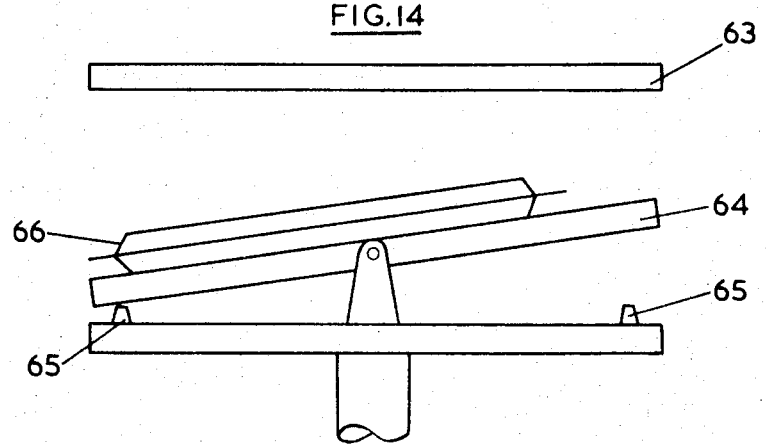
FIG. 14 illustrates, as a diagrammatic elevation, apparatus used in testing the cushion plates as set out in example 7.

The testing apparatus used is illustrated diagrammatically in FIG. 14.

The apparatus consists of a press having a fixed horizontal upper platen 63, and a lower platen 64, which can be raised hydraulically to apply pressure against an article placed between the upper platen 63 and the lower platen 64. Both platens are 15 cm. × 19 cm. in size. The lower platen 64 is pivoted about the center of the 19 cm. length so that it can rock. Adjustable stops 65, spaced 18 cm. apart, are provided to limit the degree of pivoting movement of the lower platen 64. The cushion plate 66 under test is placed off-center on the lower platen 64 with its 14 cm. edge lined up with the 15 cm. edge of the platen. The lower platen 64 is then raised to apply pressure against the cushion plate 66. Because the lower platen 64 is pivoted and the cushion plate 66 is off center, the lower platen 64 is forced on to the stop 65 on the side of the platen to which the cushion plate 66 is biased. When the pressure is applied the cushion plate 66 is consequently squeezed to a wedgeshape.

The lower platen 64 is then lowered and the cushion plate 66 moved across the lower platen 64. This causes the lower platen 64 to pivot until it contacts the other stop 65. Thus when pressure is next applied the cushion plate 66 is wedged in the opposite direction. Thus during successive cycles the cushion plate is alternately forced to a wedgeshape in opposite directions.

The amplitude of the rocking movement was the total distance that the lower platen rocked through, as measured at the position of the stops, on rocking from contacting one stop to contacting the other stop.

Even though the degree of rocking movement of platen was relatively small (ranging from 0 to 1.3 mm.) this test is far more severe than is ever likely to occur to a large cushion plate in normal usage. Cushion plates were tested to destruction and the number of cycles to failure was recorded. Tests were carried out at three pressures and a range of degrees of rocking movement. The platens were continually heated at 160° C. In all cases the mode of failure was a small metal fatigue crack near to the seam weld from which a small quantity of the ethylene glycol oozed. The test results are set out in the following table.

| Applied pressure kg./cm.² | Amplitude of rocking movement mm. | Number of cycles to failure |
| --- | --- | --- |
| 70 | 0 | 20305 |
| 35 | 0.8 | 8856 |
| 35 | 0.8 | 9879 |
| 35 | 0.5 | 22,525 |
| 35 | 0.25 | 18,585 |
| 35 | 0.25 | 37,054 |
| 17.5 | 1.3 | 14,457 |
| 17.5 | 0 | 53,737 |

Similar cushion plates were subjected to a test pressure of about 500 kg./cm.² between the parallel platens of a press without failure.

I claim:

1. A method of manufacturing a rectangular cushion plate for use as a pressure distributing pad in a sheet pressing operation comprising a pair of flexible metal sheets seam welded to each other to define a rectangular enclosure filled with a cushioning material that is liquid under the conditions of said pressing operation, said metal sheets being permanently deformed in the vicinity of the seam welds defining said rectangular enclosure so that the opposed surfaces of the metal sheets over substantially all said rectangular enclosure are planar and spaced apart from one another in a substantially parallel manner which comprises, placing two flat flexible metal sheets of sufficient rigidity to normally maintain their flat conditions in contact face to face, seam welding said metal sheets to each other around three sides of the desired rectangular enclosure while leaving the fourth side of the desired rectangular enclosure open, introducing the cushioning material in liquid form between said metal sheets from a point adjacent said fourth side of the desired rectangular enclosure whereby said cushioning material forms a layer between said metal sheets which completely fills the rectangular enclosure formed by said sheets when all the sides thereof are closed, closing the fourth side of the rectangular enclosure by seam welding whereby a convex surfaced sachetlike structure is formed while insuring that the cushioning material remains in the said rectangular enclosure so that said enclosure is completely filled with said material, subjecting said sachetlike structure to pressure between parallel press platens thus permanently deforming the metal sheets adjacent the seam welds defining the rectangular enclosure and inwardly thereof so that the opposed surfaces of the metal sheets over said rectangular enclosure are rendered planar and spaced apart in a substantially parallel manner except for a small boundary region within the rectangular enclosure which accommodates the transition of the metal sheets from the plane of the seam weld to the planes defined by the parallel spaced portions of the sheets and removing from between said platens the resulting cushion plate obtained by deforming the sachetlike structure.

2. A method as claimed in claim 1 wherein the sachetlike structure is filled with cushioning material by, holding the metal sheets apart along the fourth side to open up a cavity between the sheets bounded by the seam welds around said three sides of the rectangular enclosure, introducing the cushioning material in liquid form into said cavity so as to totally fill it, and seam welding the metal sheets together along the open edge to define the fourth side of the rectangular enclosure.

3. A method as claimed in claim 1 wherein the sachetlike structure is made by, seam welding the two metal sheets together to define an enclosed area larger than the desired rectangular enclosure with the welds defining three sides of the desired rectangular enclosure, introducing the cushioning material to between the metal sheets via an inlet aperture on the surface of one of the metal sheets within said enclosed area but outside the desired rectangular enclosure, whereby a layer of said cushioning material between said metal sheets is formed, forming a further seam weld to close the fourth side of the desired rectangular enclosure thereby isolating the filled rectangular enclosure from the rest of the enclosed area to which the inlet aperture is connected, and trimming off that portion of the enclosed area outside the desired rectangular enclosure and which encompasses said inlet aperture.

4. A method as claimed in claim 3 wherein the enclosed area is a trapezium in which three of the sides are perpendicular to each other and define three sides of the desired rectangular enclosure.

5. A method as claimed in claim 1 wherein the sachetlike structure is subjected to a pressure of 15 to 220 kg./cm.² to effect the deformation of the metal sheets.

6. The method of claim 3 which includes the further step of evacuating the air from the rectangular enclosure before introducing the cushioning material thereinto.

* * * * *